US011269745B2

(12) United States Patent
Lan et al.

(10) Patent No.: US 11,269,745 B2
(45) Date of Patent: Mar. 8, 2022

(54) TWO-NODE HIGH AVAILABILITY STORAGE SYSTEM

(71) Applicant: International Business Machines Corporation, Armonk, NY (US)

(72) Inventors: Long Wen Lan, Shanghai (CN); Wen Wu Na, Shanghai (CN); Xiang Wen Liu, Shanghai (CN); Xiao Yu Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/667,145

(22) Filed: Oct. 29, 2019

(65) Prior Publication Data
US 2021/0124658 A1 Apr. 29, 2021

(51) Int. Cl.
G06F 11/20 (2006.01)
(52) U.S. Cl.
CPC ...... *G06F 11/2087* (2013.01); *G06F 11/2071* (2013.01); *G06F 11/2056* (2013.01);
(Continued)
(58) Field of Classification Search
CPC ............ G06F 11/2053; G06F 11/2056; G06F 11/2058; G06F 11/2064; G06F 11/2071; G06F 11/2089; G06F 11/2092; G06F 3/0614; G06F 3/0617; G06F 3/0619; G06F 3/064; G06F 3/0646; G06F 3/0647; G06F 3/065; G06F 3/0683; G06F 3/0685; G06F 11/2087; G06F 2201/82; H04L 67/1097
See application file for complete search history.

(56) References Cited

U.S. PATENT DOCUMENTS 5,991,804 A * 11/1999 Bolosky .............. G06F 11/1096
707/999.01
8,498,967 B1 7/2013 Chatterjee
(Continued)

FOREIGN PATENT DOCUMENTS

CN 105426427 A 3/2016

OTHER PUBLICATIONS

"Nested RAID levels", From Wikipedia, the free encyclopedia, Archived from the original on Feb. 20, 2009, Retrieved Apr. 15, 2016, 8 pps., <https://en.wikipedia.org/wiki/Nested_RAID_levels>.
(Continued)

*Primary Examiner* — Joseph O Schell
(74) *Attorney, Agent, or Firm* — Nicholas A. Welling

(57) ABSTRACT

Aspects of the present invention disclose a method for a two-node storage system. The method includes one or more processors creating a plurality of first logic unit groups in a first storage node of a storage system. The method further includes mapping each of the plurality of first logic unit groups to a number of storage slices from different storage devices in the first storage node. The method further creating a plurality of second logic unit groups in a second storage node of the storage system, by mirroring storage slices from a storage device in the first storage node to multiple storage devices in the second storage node. In response to identifying a failure of a first storage device in the first storage node, the method further includes recovering lost data based on data in the second storage node.

18 Claims, 8 Drawing Sheets

(52) U.S. Cl.
CPC ...... *G06F 11/2064* (2013.01); *G06F 11/2092* (2013.01); *G06F 2201/82* (2013.01)

(56) References Cited

U.S. PATENT DOCUMENTS

| | | | |
|---|---|---|---|
| 8,539,197 B1* | 9/2013 | Marshall | G06F 13/00 |
| | | | 711/173 |
| 8,707,085 B2 | 4/2014 | Bodke | |
| 9,172,584 B1 | 10/2015 | Lai | |
| 9,542,125 B1* | 1/2017 | Chen | G06F 3/0649 |
| 9,692,645 B2 | 6/2017 | Banka | |
| 9,804,939 B1* | 10/2017 | Bono | G06F 11/1088 |
| 2002/0038436 A1* | 3/2002 | Suzuki | G06F 11/1084 |
| | | | 714/6.12 |
| 2003/0135514 A1* | 7/2003 | Patel | G06F 11/1076 |
| 2005/0223156 A1* | 10/2005 | Lubbers | G06F 3/0619 |
| | | | 711/100 |
| 2006/0059226 A1 | 3/2006 | McConnell | |
| 2006/0206662 A1* | 9/2006 | Ludwig | G06F 3/067 |
| | | | 711/114 |
| 2010/0251011 A1* | 9/2010 | Takagi | G06F 11/004 |
| | | | 714/6.12 |
| 2013/0173955 A1* | 7/2013 | Hallak | G06F 12/0866 |
| | | | 714/6.24 |
| 2016/0188406 A1* | 6/2016 | Harnik | G06F 11/1088 |
| | | | 714/764 |
| 2017/0077950 A1* | 3/2017 | Pavlov | H03M 13/611 |
| 2017/0286239 A1* | 10/2017 | Baptist | G06F 3/0659 |
| 2019/0188079 A1* | 6/2019 | Kohli | G06F 3/0631 |
| 2020/0117362 A1* | 4/2020 | McCarthy | G06F 3/0652 |
| 2020/0133514 A1* | 4/2020 | Xu | G06F 3/0619 |
| 2021/0160317 A1* | 5/2021 | Portz | G06F 3/067 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

* cited by examiner

TWO-NODE HIGH AVAILABILITY STORAGE SYSTEM

BACKGROUND OF THE INVENTION

The present invention relates generally to the field of storage technology, and more particularly to a two-node high availability storage system.

Generally, a storage system may comprise multiple storage nodes. Each storage node may have a plurality of storage devices. Redundant Arrays of Independent Disks (RAID) may be applied to such a storage system for high availability of the storage system. As known, RAID is a data storage virtualization technology that combines multiple physical disk drives into one or more logical units for the purposes of data redundancy, performance improvement, or both. Data can be distributed across the disk drives in one of several ways, referred to as RAID levels, depending on the required level of redundancy and performance. The different schemes or data distribution layouts are named by the word "RAID" followed by a number, for example RAID0 or RAID1.

SUMMARY

Aspects of the present invention disclose a method, computer program product, and system for a two-node storage system. The method includes one or more processors creating a plurality of first logic unit groups in a first storage node of a storage system. The method further includes one or more processors mapping each of the plurality of first logic unit groups to a number of storage slices from different storage devices in the first storage node. The method further includes one or more processors creating a plurality of second logic unit groups in a second storage node of the storage system, the plurality of second logic unit groups being mirrored logic unit groups of the plurality of first logic unit groups. Additionally, creating the plurality of second logic unit groups in the second storage node comprises one or more processors mirroring storage slices from a storage device in the first storage node to multiple storage devices in the second storage node. In response to identifying a failure of a first storage device in the first storage node, the method further includes one or more processors recovering lost data based on data in the second storage node.

Additional aspects of the present invention provide a storage system. The storage system includes a first storage node and a second storage node. The respective storage nodes include a plurality of storage devices, each of which is split into a plurality of storage slices. The storage system further includes one or more processors, a memory coupled to the one or more processors, and a set of computer program instructions stored in the memory and executed by the one or more processors to implement methods described in various embodiments of the present invention.

DETAILED DESCRIPTION

Figure 1:
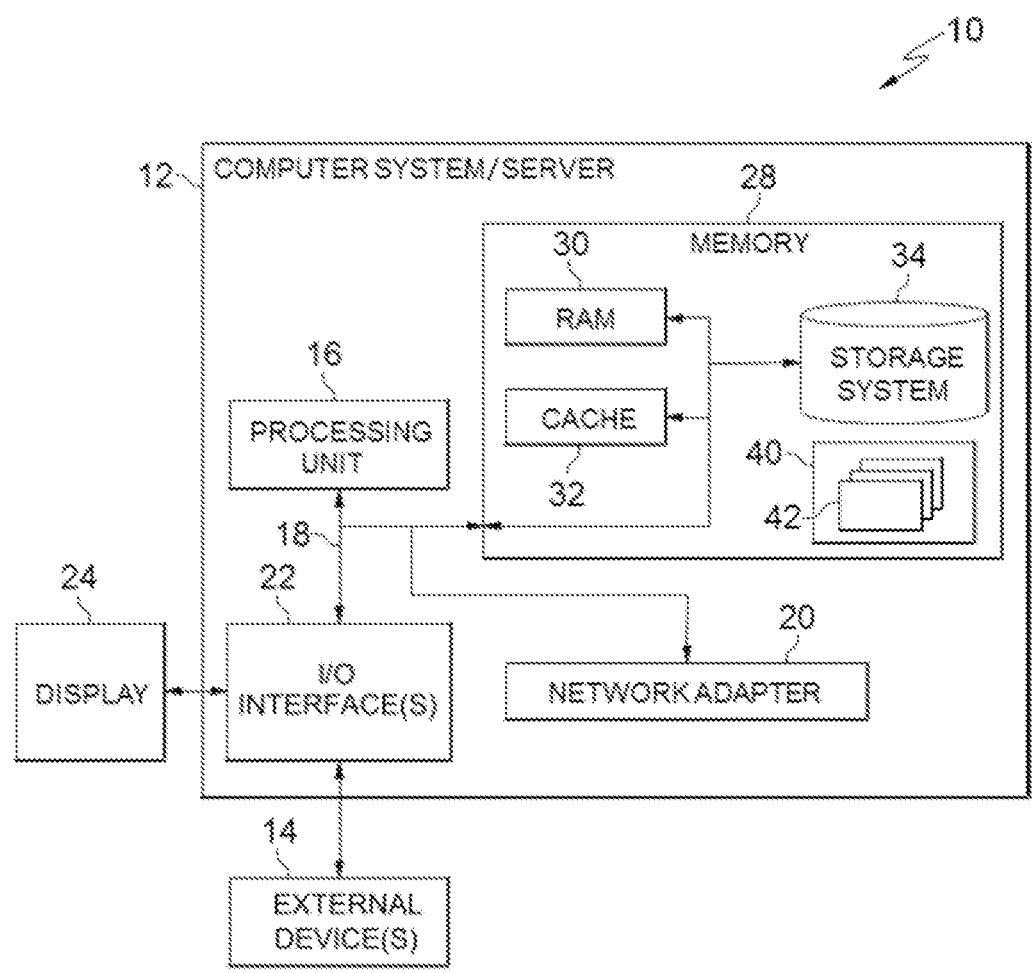
FIG. 1 depicts a cloud computing node, in accordance with an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
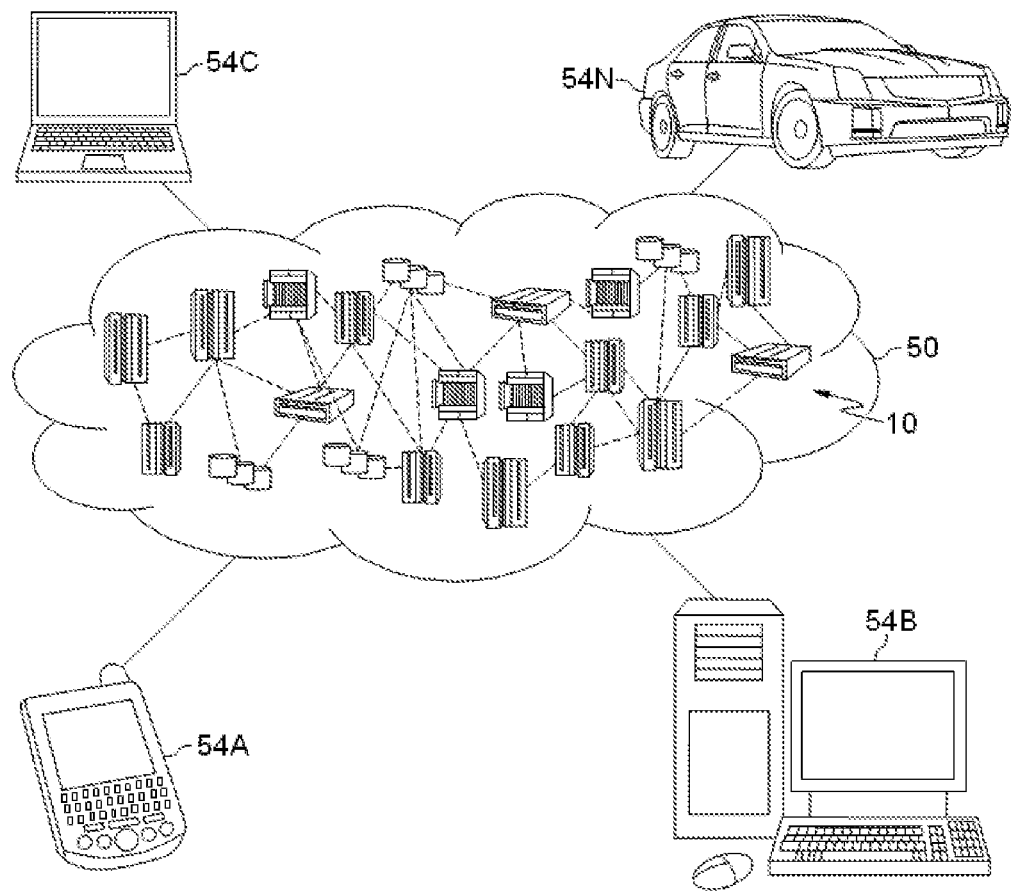
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
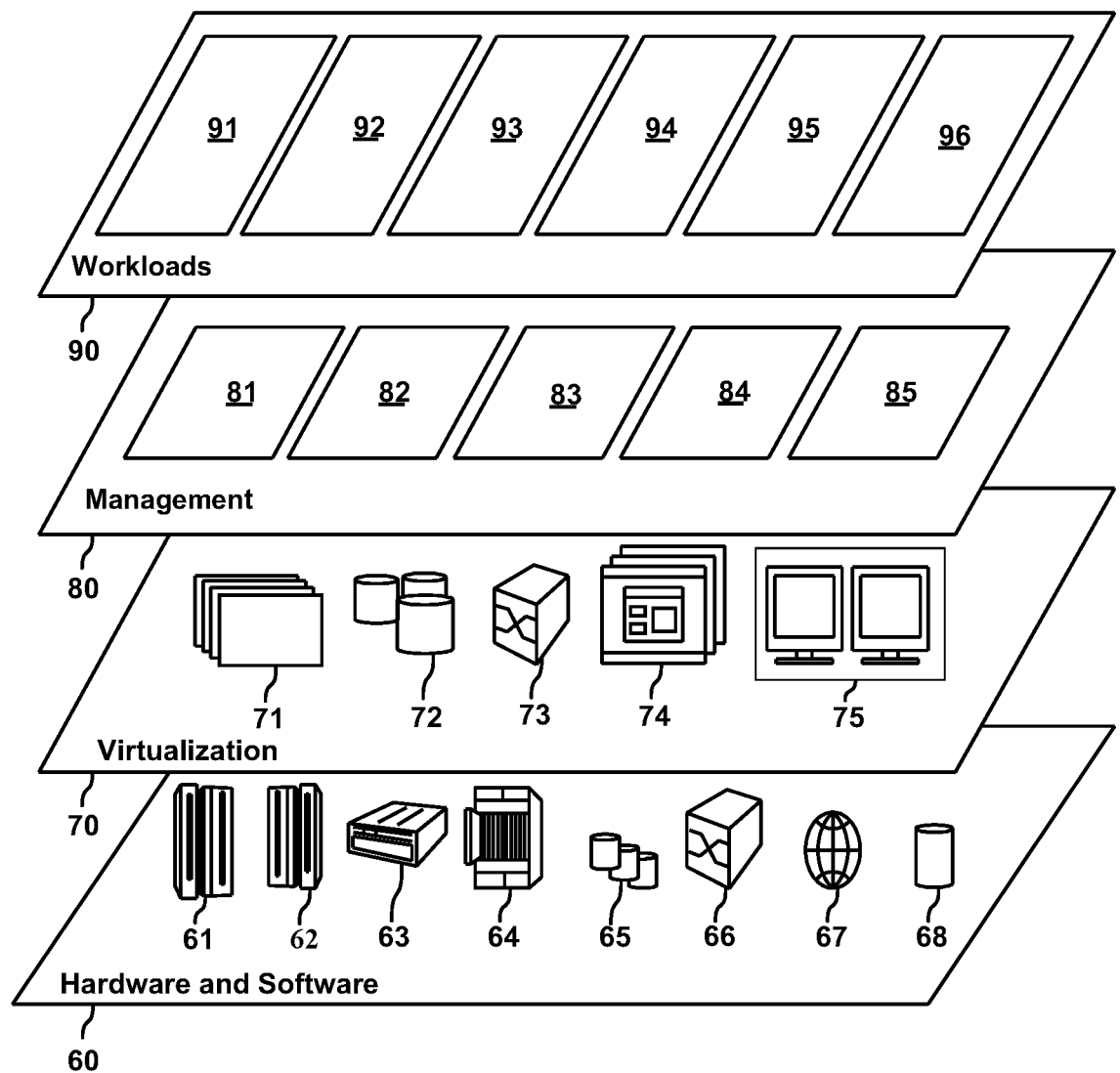
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and management of the two-node high availability storage system 96.

Generally, RAID0 (also known as a stripe set or striped volume) can split data evenly across two or more disk drives (e.g., data striping), without parity information, redundancy or fault tolerance. RAID can include an exact copy (or mirror) of a set of data on two or more disk drives. A classic RAID1 mirrored pair contains two disk drives. Embodiments of the present invention recognize that this configuration offers no parity, striping, or spanning of disk space across multiple disk drives, since the data is mirrored on all disk drives belonging to the array, and the array can only be as big as the smallest member disk drive. This layout is useful when read performance or reliability is more important than write performance or the resulting data storage capacity.

In addition to the RAID technology, erasure coding is another technology for high availability of the storage system. In coding theory, the erasure code is a forward error correction (FEC) code under the assumption of bit erasures (rather than bit errors), which transforms a message of k symbols into a longer message (code word) with n symbols such that the original message can be recovered from a subset of the n symbols.

Compared to the multiple-node storage system, embodiments of the present invention provide a two-node storage system that provides advantages that include minimized overall cost, simple operation, and easy maintenance. Accordingly, embodiments of the present invention recognize that the two-node storage system may be more suitable for small and medium-sized enterprises. In order to provide high availability for the two-node storage system, RAID1 may be used between the two nodes in this storage system.

In addition, RAID0 may be applied in each node to increase overall Input/Output (I/O) operation bandwidth.

Figure 4:
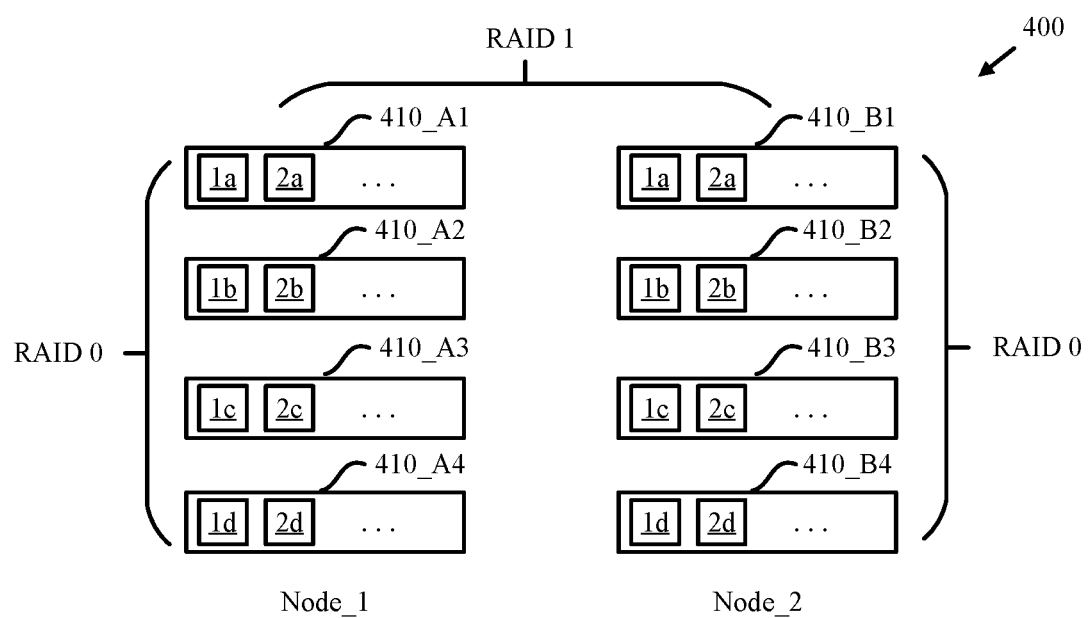
FIG. 4 depicts a diagram illustrating a two-node storage system, in accordance with an embodiment of the present invention.

FIG. 4 depicts a two-node storage system 400 having a first storage node Node_1 and a second storage node Node_2. As shown in FIG. 4, the first storage node Node_1 comprises four storage devices 410_A1, 410_A2, 410_A3, and 410_A4, and the second storage node Node_2 comprises four storage devices 410_B1, 410_B2, 410_B3, and 410_B4. In various embodiments of the present invention, storage system 400 can utilize standard RAID0 and RAID1.

RAID0 can be applied in each storage node, which stripes data evenly across the four storage devices of each storage node. For example, to the first storage node Node_1, data may be written to the storage locations 1a, 1b, 1c, and 1d of the storage devices 410_A1, 410_A2, 410_A3, and 410_A4 in parallel. Then, data may be written to the storage locations 2a, 2b, 2c, and 2d of the storage devices 410_A1, 410_A2, 410_A3, and 410_A4 in parallel. Accordingly, the overall Input/Output bandwidth of the first storage node Node_1 can be increased.

Further, RAID1 is applied between the two storage nodes (i.e., Node_1 and Node_2) to provide high availability. As shown in FIG. 4, the data in the storage locations 1a, 2a . . . , of the storage device 410_A1 in the first storage node Node_1 is mirrored to the storage locations 1a, 2a . . . , of the peer storage device 410_B1 in the second storage node Node_2. The data in the storage locations 1b, 2b . . . , of the storage device 410_A2 in the first storage node Node_1 is mirrored to the storage locations 1b, 2b . . . , of the peer storage device 410_B2 in the second storage node Node_2. The rest is mirrored similarly. Accordingly, in this embodiment, the second storage node Node_2 has an exact copy of the data in the first storage node Node_1.

When a storage device in the first storage node Node_1 fails, the peer storage device in the second storage node (i.e., Node_2) becomes a single-point-of-failure (SPOF), and the storage system 400 loses high availability. Manually replacing the failed storage device with a new storage device human intervention, which may spend a very long time. Then, the new storage device starts to synchronize data from the peer storage device, so as to restore the high availability. Considering that the storage device may have a huge size, the data recovering time may also be very long.

In addition, both storage nodes, Node_1 and Node_2, in the storage system 400 have an identical number of storage devices with the same size. As strip stride is the size of the storage device, it is not economical for the storage system 400 to add more storage devices, or replace small storage devices with larger ones, or replace slow storage devices with faster ones. In an example, the capacity of the first storage node Node_1 is 10 GB and the capacity of the second storage node Node_2 is 15 GB. Thus, up to 10 GB of the second storage node Node_2 can be used because the second storage node Node_2 is a peer node of the first storage node Node_1.

Figure 5:
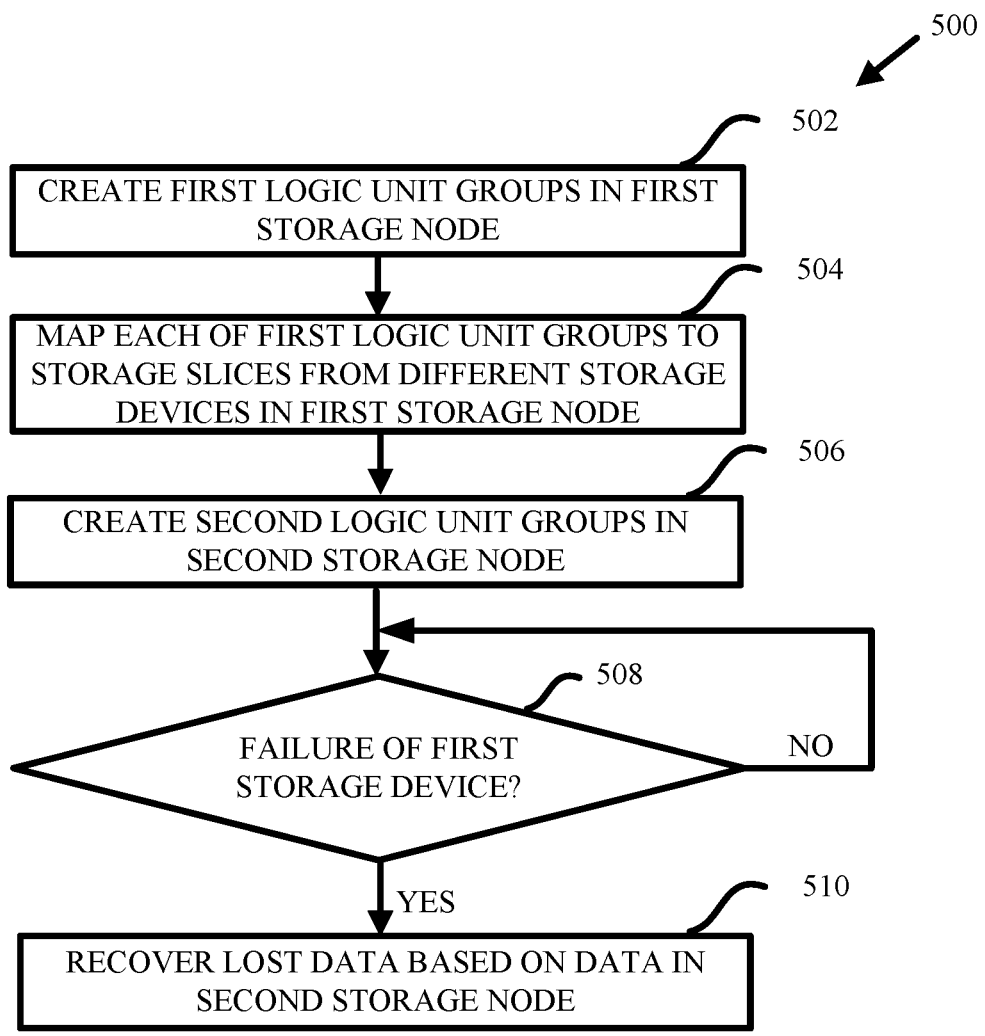
FIG. 5 depicts a schematic flowchart of the method for a storage system, in accordance with an embodiment of the present invention.

FIG. 5 illustrates a schematic flowchart of the method 500 for a storage system according to an embodiment of the present invention. Method 500 (in FIG. 5) can be implemented in a two-node high availability storage system 600 as shown in FIG. 6, in accordance with various embodiments of the present invention.

It should be noted that the management of the two-node high availability storage system 600, utilizing method 500 according to the embodiments of the present invention, could be implemented by the computer system/server 12 of FIG. 1. It should also be noted that, in addition to the cloud system described above, the embodiments of the present invention can be implemented in any computer and network systems.

Figure 6:
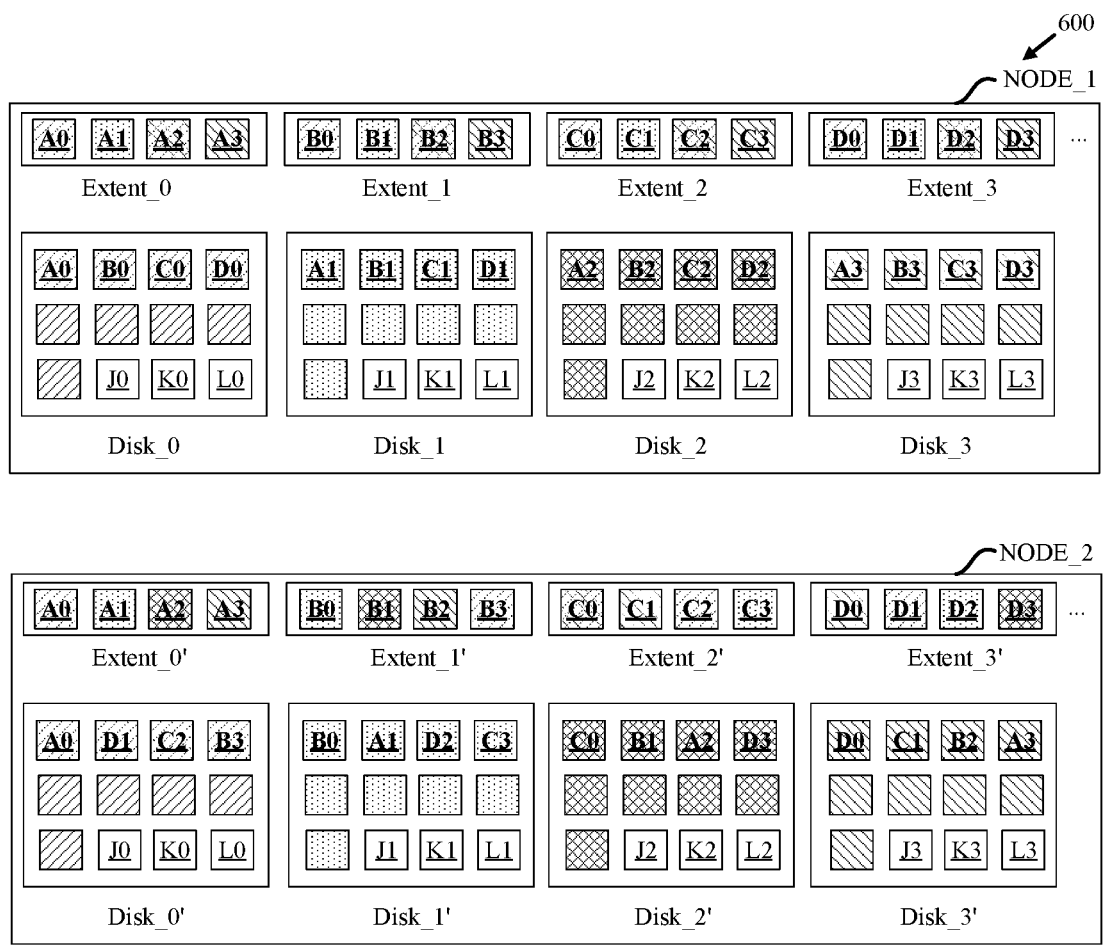
FIG. 6 depicts an example diagram of a two-node high availability storage system, in accordance with an embodiment of the present invention.

As shown in FIG. 6, the two-node high availability storage system 600 includes a first storage node (i.e., NODE_1) and a second storage node (i.e., NODE_2). The first storage node NODE_1 includes four storage devices Disk_0, Disk_1, Disk_2, and Disk_3, and the second storage node NODE_2 includes four storage devices Disk_0', Disk_1', Disk_2', and Disk_3'. Although four storage devices are illustrated as an example in FIG. 6, those skilled in the art will appreciate that the storage node may contain any number of storage devices.

In example embodiments, each storage device may be split into a plurality of storage slices (which may be known as grains). In the following descriptions, "storage slice" and "grain" will be used interchangeably. In some embodiments, the grains may have an equal size. In FIG. 6, assume that each storage device may be 96 MB in size, and each storage device may be split into twelve grains. Thus, each grain is 8 MB in size, i.e. a storage slice/grain size is 8 MB. For example, the storage device Disk_0 is split into twelve grains A0, B0, C0, D0, . . . , J0, K0, L0 in sequence, the storage device Disk_1 is split into twelve grains A1, B1, C1, D1, . . . , J1, K1, L1 in sequence, the storage device Disk_2 is split into twelve grains A2, B2, C2, D2, . . . , J2, K2, L2 in sequence, and the storage device Disk_3 is split into twelve grains A3, B3, C3, D3, . . . , J3, K3, L3 in sequence.

Referring to FIG. 5 now, method 500 creates a plurality of first logic unit groups in the first storage node (block 502). Herein, the term "logic unit group" refers to a basic unit addressable by a host connected with the two-node high availability storage system 600, such as a server or a computing device, and may be known as a virtual extent. In the following descriptions, "logic unit group" and "virtual extent" will be used interchangeably. The created virtual extents may constitute a logical unit (LU). The LU may be recognized by the host as a separate storage container. In the example of FIG. 6, four virtual extents Extent_0, Extent_1, Extent_2, and Extent_3 are created in the first storage node NODE_1, and each virtual extent is 32 M in size.

At block 504, method 500 maps each of the plurality of first logic unit groups to a number of storage slices from different storage devices in the first storage node. In one embodiment, method 500 does not map two storage slices from the same storage device to one first logic unit group, thereby achieving RAID0 in the first storage node. In some embodiments, method 500 can perform the mapping in response to receipt of the first host write command. In further embodiments, method 500 can perform the mapping as soon as the virtual extents are created.

In some embodiments, in the first storage node, a given first virtual extent may be mapped to a number of grains based on the following equation:

$$\begin{cases} DiskForGrain(m, n) = n \ \% \ DiskAmt \\ GrainIndexInDisk(m, n) = m \end{cases} \quad (1)$$

Here, DiskForGrain indicates the storage device from which the grain comes, GrainIndexInDisk indicates a position of the grain in the storage device, DiskAmt indicates an amount of the storage devices in the storage node, m represents a virtual extent identifier, n indicates a position of the grain in the virtual extent, and % represents a modulo operation. In the example as shown in FIG. 6, DiskAmt=4.

In the first storage node NODE_1, each of the virtual extents Extent_0, Extent_1, Extent_2, and Extent_3 is mapped to four grains from four storage devices Disk_0, Disk_1, Disk_2, and Disk_3 respectively. For example, the virtual extent Extent_1 is mapped to grains B0, B1, B2, and B3. According to the equation (1), for grain B2, m=1 and n=2, and thus DiskForGrain(1, 2)=2%4=2 and GrainIndexInDisk (1, 2)=1. Therefore, grain A2 is the second grain of the storage device Disk_2. In this way, method 500 maps the virtual extent Extent_1 to the second grains of the four storage devices Disk_0, Disk_1, Disk_2, and Disk_3. Similarly, method 500 maps the virtual extents Extent_0, Extent_2 and Extent_3 to the corresponding grains.

Since the virtual extent includes the grains from different storage devices, in a host write operation, the respective storage devices can be written in turn. Therefore, the workload of the respective storage devices in the first storage node NODE_1 may be balanced.

In some embodiments, a first mapping between the plurality of first logic unit groups and the storage slices in the first storage node may be recorded. Upon receipt of a host read command or a host write command which may indicate an address offset, method 500 can determine a target storage slice to be read or written according to the first mapping. Then, method 500 can read target data from, or write target data to, the target storage slice.

At block 506, method 500 creates a plurality of second logic unit groups in the second storage node. In an example embodiment, the second logic unit groups are mirrored logic unit groups of the first logic unit groups, thereby achieving RAID1 between the two storage nodes NODE_1, NODE_2. In this example embodiment, the second storage node NODE_2 is the mirrored node of the first storage node NODE_1. Accordingly, the number of the second logic unit groups can be the same as that of the first logic unit groups, and the size of the second logic unit group c equal to the size of the first logic unit group. Moreover, each of the second logic unit groups may also be mapped to the same number of storage slices from different storage devices in the second storage node. Thus, no two storage slices from the same storage device mapped to one second logic unit group, thereby achieving RAID0 in the second storage node.

In the example of FIG. 6, method 500 creates four virtual extents Extent_0', Extent_1', Extent_2', and Extent_3' in the second storage node NODE_2, and each virtual extent is 32 M in size. Moreover, method 500 can map each of the four virtual extents Extent_0', Extent_1', Extent_2', and Extent_3' to four grains from four storage devices Disk_0', Disk_1', Disk_2' and Disk_3' respectively.

Further, the storage slices from the same storage device in the first storage node may be mirrored to multiple ones of the plurality of storage devices in the second storage node. In some embodiments, some or all of the storage slices from the same storage device in the first storage node may be mirrored to different storage devices in the second storage node. Thus, at least a part of the storage slices of one storage device in the first storage node can be distributed across multiple storage devices in the second storage node.

In some embodiments, in the second storage node, a given second virtual extent may be mapped to a number of grains based on the following equation:

$$\begin{cases} DiskForGrain(m, n) = (n + m) \% \ DiskAmt \\ GrainIndexInDisk(m, n) = n + (m / DiskAmt) * DiskAmt \end{cases} \quad (2)$$

Here, DiskForGrain indicates the storage device from which the grain comes, GrainIndexInDisk indicates a position of the grain in the storage device, DiskAmt indicates an amount of the storage devices in the storage node, m represents a virtual extent identifier, n indicates a position of the grain in the virtual extent, % represents a modulo operation, and "/" represents a division operation whose result is rounded down.

In the example of FIG. 6, method 500 maps the virtual extent Extent_1' to grains B0, B1, B2 and B3. According to the equation (2), for grain B2, m=1 and n=2, and thus DiskForGrain(1, 2)=(2+1)%4=3 and GrainIndexInDisk(1, 2)=2+(¼)*4=2. Therefore, grain B2 is the third grain of the storage device Disk_3'. In this way, method 500 maps the virtual extent Extent_1' to the first grain of the storage device Disk_1' (corresponding to grain B0), the second grain of the storage device Disk_2' (corresponding to grain B1), the third grain of the storage device Disk_3' (corresponding to grain B2), and the fourth grain of the storage device Disk_0' (corresponding to grain B3). Similarly, method 500 maps the virtual extents Extent_0', Extent_2', and Extent_3' to the corresponding grains.

Therefore, the four grains from one of the storage device in the first storage node NODE_1 can be mirrored to four storage devices Disk_0', Disk_1', Disk_2', and Disk_3' of the second storage node NODE_2. As shown in FIG. 6, the grains A0, B0, C0, D0 from the storage device Disk_0 in the first storage node NODE_1 are mirrored to the four storage devices Disk_0', Disk_1', Disk_2', and Disk_3' in the second storage node NODE_2, respectively. Similarly, the grains A1, B1, C1, and D1 from the storage device Disk_1, the grains A2, B2, C2, and D2 from the storage device Disk_2, the grains A3, B3, C3, and D3 from the storage device Disk_3 are mirrored to the four storage devices Disk_0', Disk_1', Disk_2', and Disk_3' in the second storage node NODE_2, respectively.

In some embodiments, method 500 can record a second mapping between the plurality of second logic unit groups and the storage slices in the second storage node. Similar to the first storage node, if a data read operation or a data write operation is to be performed to the second storage node, method 500 can determine the target storage slice to be read or written according to the second mapping. Then target data may be read from or written to the target storage slice.

In some embodiments, method 500 can perform the mapping of the storage slices of a storage device to the virtual extents from a beginning of the storage device to an end of the storage device sequentially.

Once the first logic unit groups and the second logic unit groups are created, the host may access the first logic unit groups and the second logic unit groups using a host read/write command. When a host write command is received, the data write operation will be performed to the first storage node and the second storage node. In some embodiments, the host write command may be firstly received at the first storage node, and then may be forwarded to the second storage node. The data write operation may be performed to both the first and second storage node. In this way, the data can be synced in the first storage node and the second storage node.

At block 508, method 500 determines whether any storage device of the storage system 600 fails. In an example embodiment, method 500 determines that a storage device (which may be referred to as "first storage device") of the first storage node fails. If method 500 determines that the first storage device fails ("YES" at block 508), then method 500 recovers lost data of the first storage device based on the data in the second storage node, as shown in block 510. If method 500 determines that no storage device has failed ("NO" at block 508), then method 500 proceeds with the detection of the failure of the storage device.

As described above, the storage slices from the same storage device in the first storage node may be mirrored to the different storage devices in the second storage node. Therefore, in some embodiments, the lost data of the first storage device may be recovered from the corresponding storage devices in the second storage node to which the storage slices of the first storage device are mirrored. In the example of FIG. 6, the storage slices A0, B0, C0, and D0 of the storage device Disk_0 are mirrored to the storage devices Disk_0', Disk_1', Disk_2', and Disk_3'. When method 500 determines that the storage device Disk_0 fails, the lost data of the storage device Disk_0 may be recovered from the storage devices Disk_0', Disk_1', Disk_2', and Disk_3' concurrently. Accordingly, the recovering time can be decreased, and thus the time of the storage system 600 suffering a risk of SPOF can be decreased.

Figure 7:
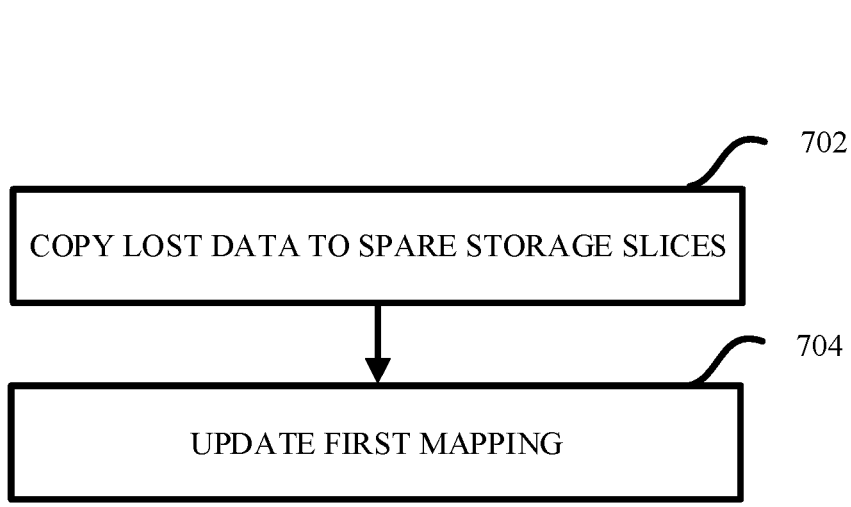
FIG. 7 depicts a schematic flowchart illustrating the recovering process, in accordance with an embodiment of the present invention.

FIG. 7 depicts a schematic flowchart illustrating the recovering process, method 700, according to an embodiment of the present invention. Method 700 (in FIG. 7) can be implemented in a two-node high availability storage system 600 as shown in FIG. 6, in accordance with various embodiments of the present invention. It should be noted that the management of the two-node high availability storage system 600, utilizing method 700 according to the embodiments of the present invention, could be implemented by the computer system/server 12 of FIG. 1. It should also be noted that, in addition to the cloud system described above, the embodiments of the present invention can be implemented in any computer and network systems.

In one embodiment, when the first storage device fails, embodiments of the present invention can recover the lost data from the corresponding storage devices in the second storage node to spare storage slices of the first storage node. In some embodiments, the spare storage slices may be the storage slices reserved for data recovery in each storage node.

In an example embodiment, in the first storage node, a predefined number of storage slices of the respective storage devices are reserved as the spare storage slices, which may also be referred to as spare grains. Various embodiments of the present invention ca determine the number of the spare grains based on an amount of the storage devices that are expected to be recovered. In further embodiments, the same number of storage slices of the respective storage devices are also reserved in the second storage node as the spare storage slices. For example, the spare grains may not be used in the mapping, as shown in block 504 in FIG. 5.

In some embodiments, the spare storage slices in a storage device may be reserved from the end of the storage device. In the example of FIG. 6, the last three grains of each storage device in the first and second storage node NODE_1, NODE_2 are reserved as the spare storage slices, which are denoted as blank blocks J0, K0, L0, J1, K1, L1, J2, K2, L2, J3, K3, and L3.

As shown in FIG. 7, when the first storage device fails, method 700 copies the lost data from the corresponding storage devices in the second storage node to the spare storage slices in the first storage node, other than from the first storage device (i.e. available spare storage slices), as shown in block 702.

In the example of FIG. 6, when the storage device Disk_0 fails, the data in the grains A0, B0, C0, D0 of the storage device Disk_0 become the lost data. As the second storage node NODE_2 is the mirrored node of the first storage node NODE_1, the aforementioned lost data are also stored in the grain A0 of the storage Disk_0', the grain B0 of the storage Disk_1', the grain C0 of the storage Disk_2', and the grain D0 of the storage Disk_3'. Therefore, method 700 can copy the lost data from the storage devices Disk_0', Disk_1', Disk_2', and Disk_3' of the second storage node NODE_2 concurrently to some of the available spare storage slices J1, K1, L1, J2, K2, L2, J3, K3 and L3, in the first storage node NODE_1. For example, method 700 can copy the data in the grain A0 of the storage device Disk_0' to the spare grain J1 of the storage device Disk_1. Further, method 700 can copy the data in the grain B0 of the storage device Disk_1' to the spare grain J2 of the storage device Disk_2, the data in the grain C0 of the storage device Disk_2' to the spare grain J3 of the storage device Disk_3, and the data in the grain D0 of the storage device Disk_3' to the spare grain K1 of the storage device Disk_1.

Through performing the copying operation in block 702, the spare grains to which the data are copied will replace the failed grains, causing the change of the mapping in the first storage node. Therefore, method 700 updates the first mapping (block 704). In some embodiments, method 700 can perform the update of the first mapping on a grain-by-grain basis. For example, method 700 updates the first mapping as soon as the lost data in a storage slice size is copied from the second storage node to a corresponding spare storage slice.

In the example of FIG. 6, after method 700 copies the lost data in the grain A0 from the grain A0 of the storage device Disk_0' to the spare grain J1 of the storage device Disk_1, method 700 re-maps the virtual extent Extent_0 to the spare grain J1, instead of the grain A0 of the storage device Disk_0. Accordingly, method 700 updates the first mapping may to record such re-mapping. According to various embodiments of the present invention, method 700 can perform the operations in blocks 702 and 704 in parallel.

Accordingly, embodiments of the present invention provide a recovering process, as described above, which does not involve human intervention. After the recovering process, the storage system can restore the high availability. As the lost data are recovered from different multiple storage device of the mirrored node in parallel, the period of the storage system suffering a risk of SPOF can be decreased.

Further, in some embodiments of the present invention, during the failure of the first storage device, the host read command, or the host write command, may be received. In the case of the host read command, embodiments of the present invention can determine whether the target storage slice is in the first storage device according to the host read command and the current first mapping. As described above, the host read command may indicate the address offset, and the target storage slice may be determined based on the address offset and the first mapping.

Accordingly, embodiments of the present invention can determine whether the target storage slice is in the first storage device. If the target storage slice is in the first storage device (i.e., the lost data in the target storage slice has not been recovered in the first storage node), then the target data may be read from the second storage node, according to the second mapping. Further, embodiments of the present invention can write the target data to the spare storage slice(s) of the first storage node. Thus, the target data is recovered in the first storage node, and accordingly the first mapping shall be updated to record the mapping between the first logic unit group and the spare storage slice(s). If the target storage slice is not in the first storage device, then the target data will be read from the target storage slice in the first storage node as normal.

In the case of the host write command, which indicates the address offset and the target data, embodiments of the present invention can determine whether the target storage slice is in the first storage device according to the host write command and the current first mapping. If the target storage slice is in the first storage device (i.e., the lost data in the target storage slice has not been recovered in the first storage node), then the size of the target data may be obtained. If the size of the target data is smaller than the storage slice size, then embodiments of the present invention can copy the lost data in the target storage slice may from the second storage node to a corresponding spare storage slice.

Upon recovery of the lost data in the target storage slice in the first storage node, embodiments of the present invention can write the target data to the corresponding spare storage slice and the second storage node. If the size of the target data is equal to the storage slice size, then the target data may be written to the spare storage slice and the second storage node directly. Since the target data is written to the spare storage slice, the first mapping shall be updated. If the target storage slice is not in the first storage device, the target data will be written to the target storage slice and the second storage node as normal.

Figure 8:
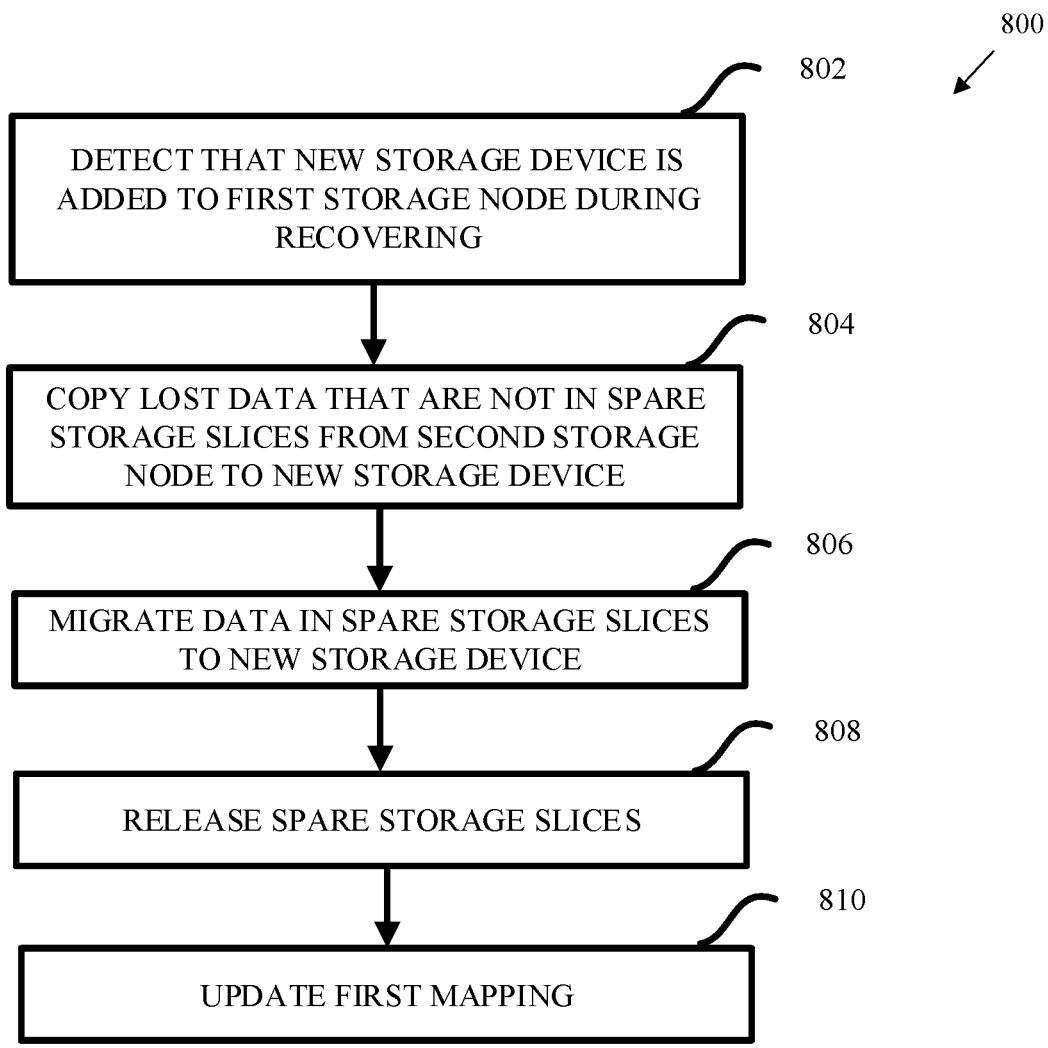
FIG. 8 depicts a schematic flowchart illustrating a process when a new storage device is added to replace a failed storage device during a recovering process, in accordance with an embodiment of the present invention.

FIG. 8 depicts a schematic flowchart illustrating a process, method 800, when a new storage device is added to replace the failed storage device during the recovering process, according to an embodiment of the present invention. Method 800 (in FIG. 8) can be implemented in a two-node high availability storage system 600 as shown in FIG. 6, in accordance with various embodiments of the present invention. It should be noted that the management of the two-node high availability storage system 600, utilizing method 800 according to the embodiments of the present invention, could be implemented by the computer system/server 12 of FIG. 1. It should also be noted that, in addition to the cloud system described above, the embodiments of the present invention can be implemented in any computer and network systems.

As shown in FIG. 8, method 800 detects that the new storage device is added to the first storage node during the recovering process to replace the failed first storage device (block 802). The new storage device may also be split into a plurality of storage slices in a similar way as other storage devices of the first storage node, in accordance with various embodiments of the present invention.

Then at block 804, method 800 copies the lost data that are not in the spare storage slices (i.e. the lost data that are not recovered in the first storage node) from the second storage node to the new storage device. In some embodiments, method 800 can check whether all the lost data are copied to the spare storage slices. Then, for the lost data that are not copied to the spare storage, method 800 can copy slices from the second storage node to the new storage device. Since the new storage device is desired to have an exact copy of the first storage device, the lost data that are not recovered may be copied from the second storage node to the new storage device according to the equation (1).

Then at block 806, method 800 migrates the data that are already in the spare storage slices to the new storage device. As described above, in the recovering process, the lost data will be copied to the spare storage slices. Once the new storage device is added, method 800 migrates the data in the spare storage slices to the new storage device, in order to free the spare storage slices.

In an example with respect to FIG. 6, when the new storage device is added, the data in the grains A0 and B0 have been copied to spare grains J1 and J2 respectively, and the data in the grains C0 and D0 have not been copied to the spare grains yet. Then, method 800 can copy the data in the grain C0 of the storage device Disk_2' to the third grain of the new storage device. In addition, method 800 copies the data in the grain D0 of the storage device Disk_3' to the fourth grain of the new storage device. Moreover, method 800 can migrate the data in the spare grains J1 and J2 to the new storage device. Method 800 can migrate the data in the spare grain J1 to the first grain of the new storage device and can migrate the data in the spare grain J2 to the second grain of the new storage device. Accordingly, in this example, the new storage device can have the exact copy of the first storage device.

After the data is migrated from the spare storage slices to the new storage device, method 800 releases the spare storage slices (block 808). Then, the spare storage slices may be used for handling another failure in the first storage node.

With the operations in blocks 804 and 806, method 800 can facilitate the new storage device to completely replace the first storage node, and thus this cause the change of the mapping between the virtual extents and the grains in the first storage node. Therefore, in block 810, method 800 updates the first mapping. In some embodiments, method 800 can perform the update of the first mapping may on a grain-by-grain basis. That is, method 8—updates the first mapping as soon as the lost data in the storage slice size is copied from the second storage node to the corresponding storage slice of the new storage device or the data in one spare storage slice is migrated to the corresponding storage slice of the new storage device.

In an example with regard to FIG. 6, once the data in the spare grain J1 of the storage device Disk_1 is migrated to the first grain of the new storage device, the virtual extent Extent_0 will be re-mapped to the first grain of the new storage device instead of the spare grain J1. Thus, method 800 updates the first mapping to record such re-mapping. Also, once the data in the grain C0 of the storage device Disk_2' is copied to the third grain of the new storage device, method 800 can re-map the virtual extent Extent_0 to the third grain of the new storage device instead of the grain C0 of the storage device Disk_0. Thus, method 800 can update the first mapping to record such re-mapping, in accordance with various embodiments of the present invention.

It should be noted that method 800 can perform the operations in blocks 804 and 806 in a reverse order or in parallel, in accordance with various embodiments of the present invention. Further, method 800 can perform the operations in block 810 in parallel with the operations in blocks 804 and 806, in accordance with various embodiments of the present invention.

Further, in some embodiments, the host read command and the host write command may be received after the new storage device is added. In the case of the host read command, embodiments of the present invention can determine whether the target storage slice is in the first storage device based on the host read command and the current first mapping. If the target storage slice is in the first storage device (i.e., the lost data in the target storage slice has not been recovered in the first storage node), then the target data may be read from the second storage node according to the second mapping. Then, embodiments of the present invention can write the target data to the new storage device. Thus, embodiments of the present invention can recover the target data in the first storage node, and accordingly update the first mapping to record the mapping between the first logic unit group and the storage slice(s) of the new storage device. If the target storage slice is not in the first storage device, then the target data will be read from the target storage slice in the first storage node as normal.

In the case of the host write command, embodiments of the present invention can determine whether the target storage slice is in the first storage device or in the spare storage slices or in the new storage device, according to the host write command and the current first mapping.

In the case that the target storage slice is in the first storage device (i.e., the lost data in the target storage slice has not been recovered in the first storage node), embodiments of the present invention can obtain the size of the target data. If the size of the target data is smaller than the storage slice size, then embodiments of the present invention can copy the lost data in the target storage slice from the second storage node to a corresponding storage slice of the new storage device. Upon recovery of the lost data in the target storage slice in the new storage device, embodiments of the present invention can write the target data to the corresponding storage slice of the new storage device and the second storage node. If the size of target data is equal to the storage slice size, then, embodiments of the present invention can write target data to the new storage device and the second storage node directly. Since the target data is written to the new storage device, embodiments of the present invention update the first mapping.

In the case that the target storage slice is in the spare storage slices (i.e., the lost data is recovered in the spare storage slices), embodiments of the present invention can obtain the size of the target data. If the size of the target data is smaller than the storage slice size, then embodiments of the present invention can migrate the data in the target storage slice to a corresponding storage slice of the new storage device. Then, embodiments of the present invention can write the target data to the corresponding storage slice of the new storage device and the second storage node. Further, embodiments of the present invention release the target storage slice in the spare storage slices. If the size of the target data is equal to the storage slice size, then embodiments of the present invention can write target data to the new storage device and the second storage node directly and release the target storage slice in the spare storage slices. Since the target data is written to the new storage device, embodiments of the present invention update the first mapping.

In the case that the target storage slice is in the new storage device, embodiments of the present invention can write the target data to the target storage slice and the second storage node as normal.

Accordingly, embodiments of the present invention operate to significantly decrease the overall recovering time, and facilitate a self-healing storage system, by further using the spare storage slices without human intervention. Moreover, the host read/write operation can be still served even if the storage device is failed.

In addition, in some embodiments, in addition to the reserved spare storage slices, unused storage slices of the respective storage devices in each storage node may also be used as the spare storage slices. The unused storage slices may be the storage slices that are not mapped to any logical unit group or may be the mapped storage slices that are not occupied. Accordingly, more storage device failures can be supported.

Additionally, in some embodiments, in addition to achieving RAID1 in the storage system, the erasure coding technology may be used in the storage system, such as the two-node high availability storage system as shown in FIG. 6. In an embodiment, the erasure coding may be applied on the data in the first storage node to obtain erasure codes. Then, embodiments of the present invention can store the erasure codes in one or more of the storage devices in the first storage node. When the first storage device fails, embodiments of the present invention facilitate recovery of the lost data using the erasure codes and the data in the surviving storage devices of the first storage node, as well as the data in the second storage node, if the recovering does not affect the normal host read/write operations to the storage system. The recovering based on the erasure code is well known to those skilled in the art, and thus the detailed description will be omitted herein.

Figure 9:
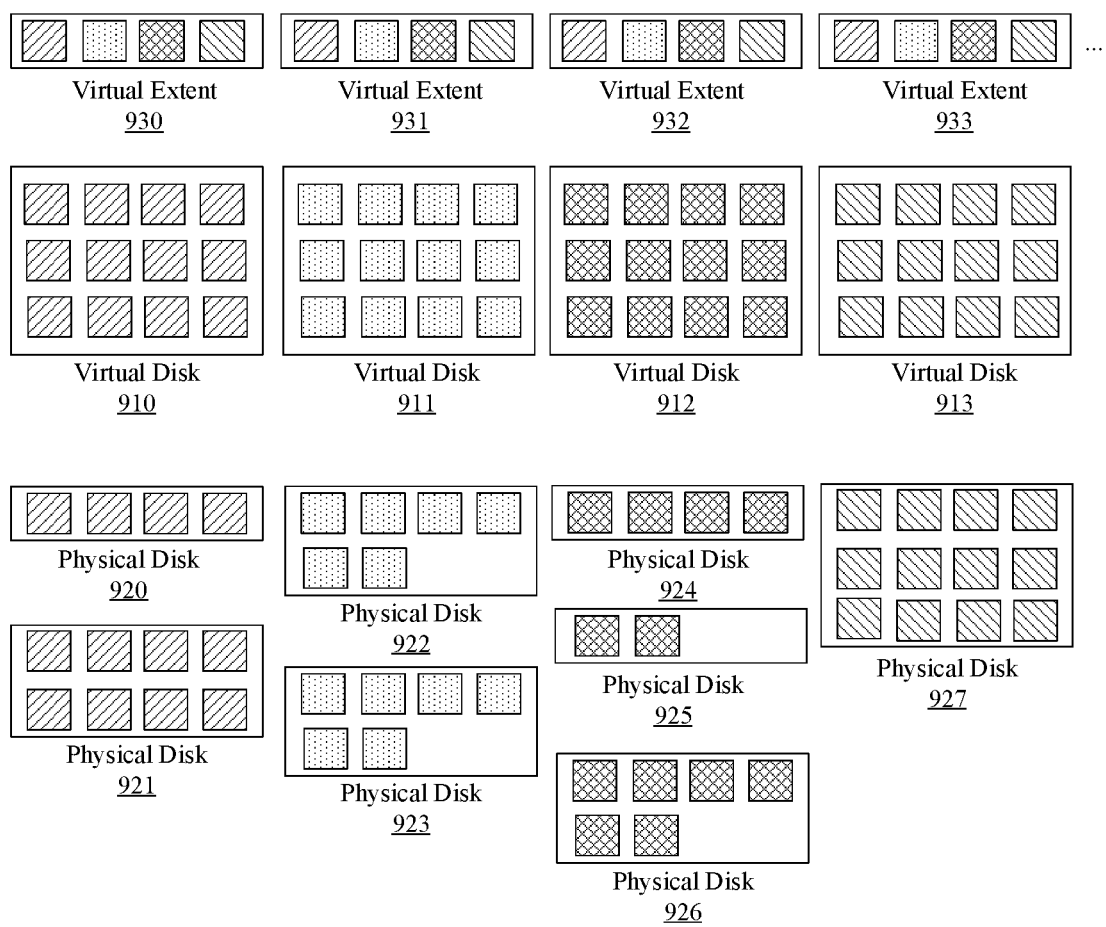
FIG. 9 depicts an example diagram of a storage node of the high availability storage system, in accordance with an embodiment of the present invention.

Additionally, in some embodiments, the storage devices may be physical disks. Accordingly, embodiments of the present invention recognize benefits when the physical disks are an equal size, since RAID1 is achieved between the two storage nodes Alternatively, in some embodiments, the storage devices may be virtual disks. FIG. 9 depicts an example diagram of the storage node in the storage system according to an embodiment of the present invention. In this example, the storage devices are the virtual disks and the virtual disks may have an equal size (i.e. twelve grains).

In various embodiments, each of the virtual disks can be mapped to one or more physical disks with different sizes. As shown in FIG. 9, the virtual disk 910 is mapped to the physical disk 920 with four grains and the physical disk 921 with eight grains. The virtual disk 911 is mapped to the physical disk 922 with six grains and the physical disk 923 with six grains. The virtual disk 912 is mapped to the physical disk 924 with four grains, the physical disk 925 with two grains and the physical disk 926 with six grains. The virtual disk 913 is mapped to the physical disk 927 with twelve grains. Further, the virtual extent 930, 931, 932, 933 are mapped to the grains of the virtual disks. With such storage node, the physical disks with different sizes can be used to scale up the storage capacity of the storage system.

It should be noted that the first storage device of the first storage node is considered as the failed storage device in the above embodiments, but those skilled in the art will appreciate that the similar processing will be applied to the case where any storage device of the second storage node is failed. In this case, the operations with respect to the first storage node will be performed in the second storage node, and the operations with respect to the second storage will be performed in the first storage node.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a storage system, the method comprising:
    creating, by one or more processors, a plurality of first logic unit groups in a first storage node of a storage system;
    recording, by the one or more processors, a first mapping between the plurality of first logic unit groups and a number of storage slices from respective storage devices in the first storage node;

creating, by the one or more processors, a plurality of second logic unit groups in a second storage node of the storage system, the plurality of second logic unit groups being mirrored logic unit groups of the plurality of first logic unit groups, wherein creating the plurality of second logic unit groups in the second storage node comprises:

mirroring, by the one or more processors, storage slices from a storage device in the first storage node to multiple storage devices in the second storage node based, at least in part, on:

determining, by the one or more processors, in response to a first host read command, that a target storage slice is in a first storage device in the first storage node according to the first mapping;

in response to determining that a size of target data is smaller than a storage slice size and the data in the target storage slice has been copied to a corresponding spare storage slice, writing, by the one or more processors, the target data to the corresponding spare storage slice and the second storage node; and in response to determining that the size of the target data is equal to the storage slice, writing, by the one or more processors, the target data to the corresponding spare storage slice and the second storage node; and in response to identifying a failure of the first storage device in the first storage node, recovering, by the one or more processors, lost data based on data in the second storage node.

2. The method according to claim 1, wherein the recovering the lost data based on the data in the second storage node further comprises:

copying, by the one or more processors, the lost data from corresponding storage devices in the second storage node to the spare storage slices; and updating, by the one or more processors, the first mapping based on the copied lost data.

3. The method according to claim 1, further comprising:

in response to a second host read command, determining, by the one or more processors, that the target storage slice is in the first storage device according to the first mapping;

reading, by the one or more processors, target data from the second storage node according to a second mapping between the plurality of second logic unit groups and a number of storage slices from respective storage devices in a second storage node;

writing, by the one or more processors, the target data to a corresponding spare storage slice; and updating, by the one or more processors, the first mapping.

4. The method according to claim 3, further comprising:

detecting, by the one or more processors, that a new storage device is added to the first storage node during the recovering, the new storage device being split into a plurality of storage slices;

copying, by the one or more processors, the lost data that are not in the spare storage slices from the second storage node to the new storage device;

migrating, by the one or more processors, the data in the spare storage slices to the new storage device; and releasing, by the one or more processors, the spare storage slices.

5. The method according to claim 3, further comprising:

detecting, by the one or more processors, that a new storage device is added to the first storage node during the recovering, the new storage device being split into a plurality of storage slices;

in response to a host read command, determining, by the one or more processors, that a target storage slice is in the first storage device according to the first mapping;

reading, by the one or more processors, target data from the second storage node according to the second mapping;

writing, by the one or more processors, the target data to the new storage device; and updating, by the one or more processors, the first mapping.

6. The method according to claim 1, further comprising:

obtaining, by the one or more processors, erasure codes by applying erasure coding on data in the first storage node; and storing, by the one or more processors, the erasure codes in multiple instances of the plurality of storage devices in the first storage node, wherein the recovering of the lost data is further based on the erasure codes and the data in one or more storage devices of the first storage node other than the first storage device.

7. The method according to claim 1, wherein the spare storage slices further comprise unused storage slices of the plurality of storage devices in the first storage node.

8. A computer system comprising:

one or more computer processors;

one or more computer readable storage media; and program instructions stored on the computer readable storage media for execution by at least one of the one or more processors, the program instructions comprising:

program instructions to create a plurality of first logic unit groups in a first storage node of a storage system;

program instruction to record a first mapping between the plurality of first logic unit groups and a number of storage slices from respective storage devices in the first storage node;

program instructions to create a plurality of second logic unit groups in a second storage node of the storage system, the plurality of second logic unit groups being mirrored logic unit groups of the plurality of first logic unit groups, wherein creating the plurality of second logic unit groups in the second storage node comprise program instructions to:

mirror storage slices from a storage device in the first storage node to multiple storage devices in the second storage node based at least in part, on determining in response to a first host read command, that a target storage slice is in a first storage device in the first storage node according to the first mapping;

in response to determining that a size of target data is smaller than a storage slice size and the data in the target storage slice has been copied to a corresponding spare storage slice, write the target data to the corresponding spare storage slice and the second storage node; and in response to determining that the size of the target data is equal to the storage slice, write the target data to the corresponding spare storage slice and the second storage node; and in response to identifying a failure of the first storage device in the first storage node, program instructions to recover lost data based on data in the second storage node.

9. The computer system of claim 8, further comprising program instructions, stored on the computer readable storage media for execution by at least one of the one or more processors, to:
   wherein the program instructions to recover the lost data based on the data in the second storage node further comprise program instructions to:
      copy the lost data from corresponding storage devices in the second storage node to the spare storage slices; and
      update the first mapping based on the copied lost data.

10. The computer system of claim 8, further comprising program instructions, stored on the computer readable storage media for execution by at least one of the one or more processors, to:
   in response to a second host read command, determine that the target storage slice is in the first storage device according to the first mapping;
   read target data from the second storage node according to a second mapping between the plurality of second logic unit groups and a number of storage slices from respective storage devices in a second storage node;
   write the target data to a corresponding spare storage slice; and
   update the first mapping.

11. The computer system according to claim 10, further comprising program instructions, stored on the computer readable storage media for execution by at least one of the one or more processors, to:
   detect that a new storage device is added to the first storage node during the recovering, the new storage device being split into a plurality of storage slices;
   in response to a host read command, determine that a target storage slice is in the first storage device according to the first mapping;
   read target data from the second storage node according to the second mapping;
   write the target data to the new storage device; and
   update the first mapping.

12. The computer system of claim 10, further comprising program instructions, stored on the computer readable storage media for execution by at least one of the one or more processors, to:
   detect that a new storage device is added to the first storage node during the recovering, the new storage device being split into a plurality of storage slices;
   copy the lost data that are not in the spare storage slices from the second storage node to the new storage device;
   migrate the data in the spare storage slices to the new storage device; and
   release the spare storage slices.

13. The computer system according to claim 8, further comprising program instructions, stored on the computer readable storage media for execution by at least one of the one or more processors, to:
   obtain erasure codes by applying erasure coding on data in the first storage node; and
   store the erasure codes in multiple instances of the plurality of storage devices in the first storage node, wherein the recovering of the lost data is further based on the erasure codes and the data in one or more storage devices of the first storage node other than the first storage device.

14. The computer system according to claim 8, wherein the spare storage slices further comprise unused storage slices of the plurality of storage devices in the first storage node.

15. A computer program product comprising:
   one or more computer readable storage media and program instructions stored on the one or more computer readable storage media, the program instructions comprising:
   program instructions to create a plurality of first logic unit groups in a first storage node of a storage system;
   program instructions to create a plurality of first logic unit groups in a first storage node of a storage system;
   program instruction to record a first mapping between the plurality of first logic unit groups and a number of storage slices from respective storage devices in the first storage node;
   program instructions to create a plurality of second logic unit groups in a second storage node of the storage system, the plurality of second logic unit groups being mirrored logic unit groups of the plurality of first logic unit groups, wherein creating the plurality of second logic unit groups in the second storage node comprise program instructions to:
      mirror storage slices from a storage device in the first storage node to multiple storage devices in the second storage node based at least in part, on
         determining in response to a first host read command, that a target storage slice is in a first storage device in the first storage node according to the first mapping;
         in response to determining that a size of target data is smaller than a storage slice size and the data in the target storage slice has been copied to a corresponding spare storage slice, write the target data to the corresponding spare storage slice and the second storage node; and
         in response to determining that the size of the target data is equal to the storage slice, write the target data to the corresponding spare storage slice and the second storage node; and
   in response to identifying a failure of the first storage device in the first storage node, program instructions to recover lost data based on data in the second storage node.

16. The computer program product of claim 15, further comprising program instructions, stored on the one or more computer readable storage media, to:
   wherein the program instructions to recover the lost data based on the data in the second storage node further comprise program instructions to:
      copy the lost data from corresponding storage devices in the second storage node to the spare storage slices; and
      update the first mapping based on the copied lost data.

17. The computer program product according to claim 15, further comprising program instructions, stored on the one or more computer readable storage media, to:
   detect that a new storage device is added to the first storage node during the recovering, the new storage device being split into a plurality of storage slices;
   in response to a host read command, determine that a target storage slice is in the first storage device according to the first mapping;

read target data from the second storage node according to the second mapping;
write the target data to the new storage device; and
update the first mapping.

18. The computer program product according to claim 15, wherein the spare storage slices further comprise unused storage slices of the plurality of storage devices in the first storage node.

* * * * *